(12) United States Patent
Tsujita et al.

(10) Patent No.: US 10,640,134 B2
(45) Date of Patent: May 5, 2020

(54) TRAIN POSITION DETECTION DEVICE

(71) Applicant: Mitsubishi Electric Corporation, Chiyoda-ku (JP)

(72) Inventors: Wataru Tsujita, Chiyoda-ku (JP); Kenji Inomata, Chiyoda-ku (JP); Seiya Nagashima, Chiyoda-ku (JP); Kazuhiro Tahara, Chiyoda-ku (JP)

(73) Assignee: Misubishi Electric Corporation, Chiyoda-ku (JP)

( * ) Notice: Subject to any disclaimer, the term of this patent is extended or adjusted under 35 U.S.C. 154(b) by 542 days.

(21) Appl. No.: 15/108,710

(22) PCT Filed: Oct. 6, 2014

(86) PCT No.: PCT/JP2014/076670
§ 371 (c)(1),
(2) Date: Jun. 28, 2016

(87) PCT Pub. No.: WO2015/104876
PCT Pub. Date: Jul. 16, 2015

(65) Prior Publication Data
US 2016/0325766 A1    Nov. 10, 2016

(30) Foreign Application Priority Data

Jan. 9, 2014 (JP) .................................. 2014-002383

(51) Int. Cl.
*G01S 5/02* (2010.01)
*B61L 25/02* (2006.01)
(Continued)

(52) U.S. Cl.
CPC ............. *B61L 25/025* (2013.01); *B61L 3/125* (2013.01); *B61L 15/0027* (2013.01);
(Continued)

(58) Field of Classification Search
CPC .... B61L 3/125; B61L 15/0027; B61L 25/026; B61L 25/021; B61L 25/025; G01S 5/02; G01S 11/10; G01S 11/12; G01S 5/08
See application file for complete search history.

(56) References Cited

U.S. PATENT DOCUMENTS 3,889,264 A * 6/1975 Fletcher .................... G01S 5/10
342/394
5,803,411 A * 9/1998 Ackerman ................ B61L 3/00
246/169 R
(Continued)

FOREIGN PATENT DOCUMENTS

GB    2248512 A *  4/1992 .............. B61L 23/34
JP    3-240326 A    10/1991
(Continued)

OTHER PUBLICATIONS

International Search Report dated Dec. 22, 2014 in PCT/JP14/076670 Filed Oct. 6, 2014.
(Continued)

*Primary Examiner* — Paresh Patel
*Assistant Examiner* — Brent J Andrews
(74) *Attorney, Agent, or Firm* — Oblon, McClelland, Maier & Neustadt, L.L.P.

(57) ABSTRACT

Based on a ratio between Doppler frequencies calculated from a plurality of reception signals outputted by a receiver, a position detector calculates a relative position of a plurality of antennas in a mobile wireless apparatus to a stationary wireless apparatus. A train position detector calculates a position of a train from the calculated relative position, a placement position of the stationary wireless apparatus and placement positions in the train of the plurality of antennas.

8 Claims, 9 Drawing Sheets

(51) Int. Cl.
    *B61L 3/12*           (2006.01)
    *B61L 15/00*         (2006.01)
    *G01S 11/10*         (2006.01)
    *G01S 5/08*          (2006.01)
    *G01S 11/12*         (2006.01)

(52) U.S. Cl.
    CPC ........... *B61L 25/021* (2013.01); *B61L 25/026* (2013.01); *G01S 5/02* (2013.01); *G01S 5/08* (2013.01); *G01S 11/10* (2013.01); *G01S 11/12* (2013.01)

(56) References Cited

U.S. PATENT DOCUMENTS

| | | | |
|---|---|---|---|
| 6,184,831 B1 * | 2/2001 | Dalby | G01S 5/06 342/107 |
| 2003/0148698 A1 | 8/2003 | Koenig | |

FOREIGN PATENT DOCUMENTS

| | | |
|---|---|---|
| JP | 4-13983 A | 1/1992 |
| JP | 7-198834 A | 8/1995 |
| JP | 10-104345 A | 4/1998 |
| JP | 2010-236951 A | 10/2010 |

OTHER PUBLICATIONS

Office Action dated Dec. 4, 2019 in corresponding Indian Patent Application No. 201647021184 (with English Translation).

\* cited by examiner

TRAIN POSITION DETECTION DEVICE

TECHNICAL FIELD

The present invention relates to a train position detection device for detecting a position of a train that is required for performing a train traffic control and, in particular, relates to a configuration for detecting the position of the train at a fixed point.

BACKGROUND ART

As described, for example, in Patent Document 1, there is a device that is placed beside the track of a train and that is configured to detect the position of the train upon receiving a specified electric wave from a stationary wireless apparatus that radiates such an electric wave. This device is that which detects reaching a specified position of a train car according to a difference between a Doppler frequency of the electric wave received by an antenna placed at the front of the car and a Doppler frequency of the electric wave received by an antenna placed at the rear of the car.

CITATION LIST

Patent Document

Patent Document 1: Japanese Patent Application Laid-open No. H04-13983

SUMMARY OF THE INVENTION

Problems to be Solved by the Invention

As described above, the conventional device measures the Doppler frequencies of the signals received by the two antennas and, when a difference occurs therebetween, judges that the train have passed through just beside that position. However, with respect to the time at which a difference between the Doppler frequencies occurs, there is a width corresponding to a very short time Δt, so that an error corresponding to a traveling speed V×Δt occurs at the time of the passage judgement. This causes a problem that, even if it is able to detect passing through "an area near to just beside" a base station, it is unable to detect being at "just beside" exactly.

This invention has been made to solve the problem as described above, and an object thereof is to provide a train position detection device which can highly accurately calculates the train position.

Means for Solving the Problems

A train position detection device of the invention comprises: a receiver to take out electric waves as reception signals respectively through a plurality of antennas, said plurality of antennas placed on a train traveling on a track with a specified interval therebetween, and the electric waves provided from a stationary wireless apparatus that is placed beside the track of the train and radiates, as an electric wave, a transmission signal having a specified frequency, amplitude or phase; and a position detector to calculate a relative position of the plurality of antennas to the stationary wireless apparatus, from a ratio between Doppler frequencies calculated respectively from the plural reception signals.

Effect of the Invention

The train position detection device of this invention is configured to calculate the relative position of the plurality of antennas to the stationary wireless apparatus on the basis of the ratio between the Doppler frequencies calculated from the plurality of reception signals, to thereby calculate the position of the train using that relative position. Thus, it is possible to highly accurately calculate the train position.

MODES FOR CARRYING OUT THE INVENTION

Hereinafter, for illustrating the invention in more detail, embodiments for carrying out the invention will be described according to the accompanying drawings.

Embodiment 1

Figure 1:
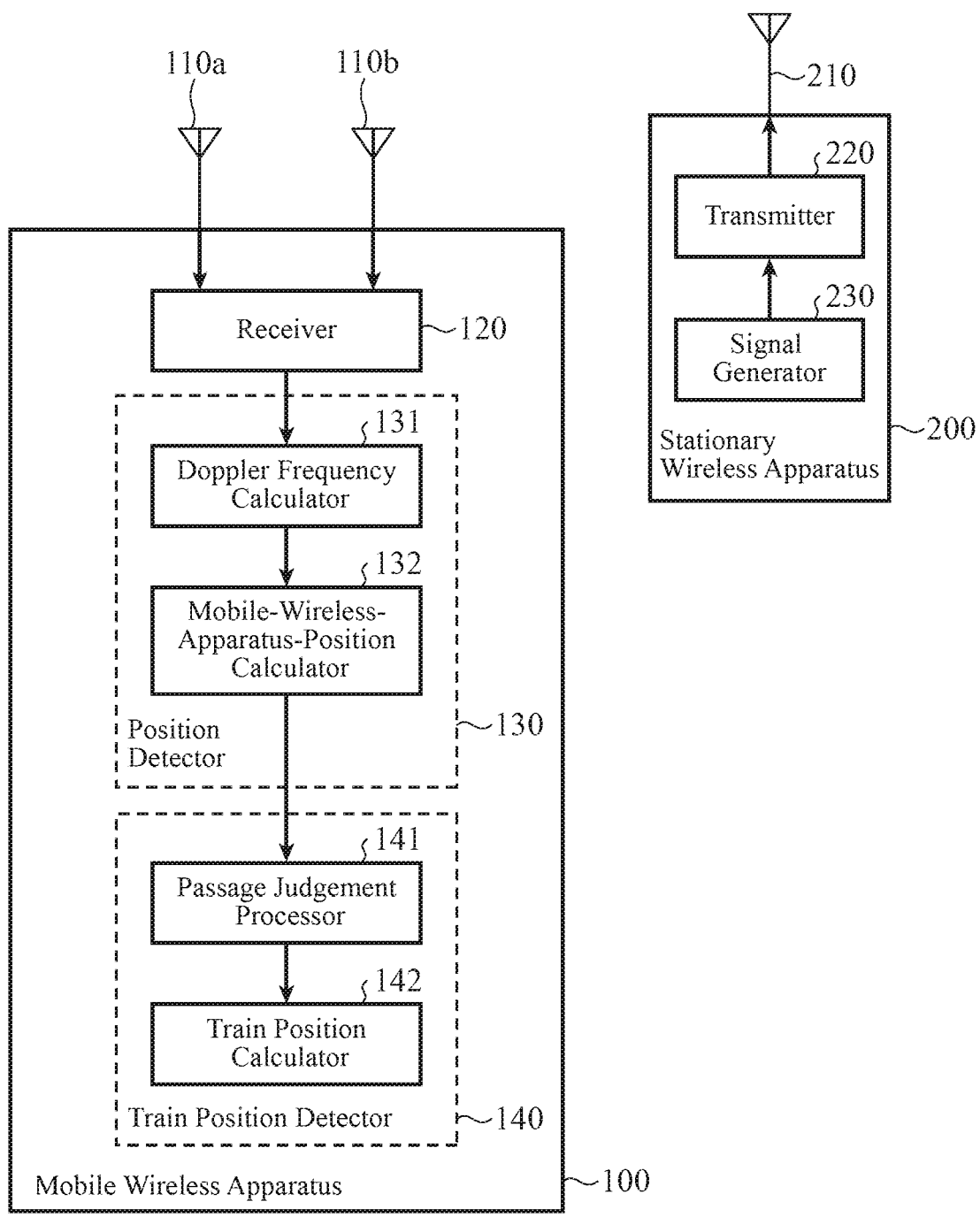
FIG. 1 is a configuration diagram showing a train position detection device according to Embodiment 1 of the invention.

FIG. 1 is a configuration diagram showing a train position detection device according to Embodiment 1 of the invention.

As shown in FIG. 1, the train position detection device is provided to be applied to a configuration comprising a mobile wireless apparatus 100 mounted on a train and a stationary wireless apparatus 200 placed beside a track. The mobile wireless apparatus 100 includes: a first antenna 110*a* and a second antenna 110*b* that are placed with a specified interval therebetween; a receiver 120; a position detector 130; and a train position detector 140. The position detector 130 includes a Doppler frequency calculator 131 and a mobile-wireless-apparatus-position calculator 132. The train position detector 140 includes a passage judgement processor 141 and a train position calculator 142. The stationary wireless apparatus 200 includes an antenna 210, a transmitter 220 and a signal generator 230.

Here, the receiver 120 is a processing unit that receives at the antennas 110*a*, 110*b*, electric waves transmitted from the stationary wireless apparatus 200, to thereby output them as two reception signals. The position detector 130 is a processing unit that calculates a relative position of the mobile wireless apparatus 100 to the stationary wireless apparatus 200 on the basis of: a ratio between the Doppler frequencies calculated based on the plural reception signals outputted from the receiver 120; a distance between the stationary wireless apparatus 200 and the track; and the placement interval between the antennas 110*a*, 110*b*. Namely, upon detection that the ratio between the Doppler frequencies becomes negative, the position detector 130 detects that the mobile wireless apparatus 100 is present in an area near to just beside the stationary wireless apparatus 200 and, when so detected the presence in the area near to the just beside, outputs the relative position of the mobile wireless apparatus 100 with respect to the stationary wireless apparatus 200.

The train position detector 140 is a processing unit that, upon receiving the relative position of the mobile wireless apparatus 100 to the stationary wireless apparatus 200 outputted from the position detector 130, judges that the mobile wireless apparatus 100 is present in an area near to just beside the stationary wireless apparatus 200, to thereby calculate the position of the train from the relative position of the mobile wireless apparatus 100 to the stationary wireless apparatus 200, the placement position of the stationary wireless apparatus, and the placement position in the train of the mobile wireless apparatus 100.

Here, "the mobile wireless apparatus 100 is present in an area near to just beside the stationary wireless apparatus 200" means that the position of the stationary wireless apparatus 200 is located between the antennas 110*a*, 110*b*. In other words, it means that one of the antennas 110*a*, 110*b* has passed through just beside the stationary wireless apparatus 200 but the other one has not passed through just beside the stationary wireless apparatus 200. Further, the position of the train means a position with respect to a specific portion in the train, for example, a position of the head of the train which is used for a train control. The mobile wireless apparatus 100 is not necessarily placed so that it is matched to the position of the train.

Next, operations of the train position detection device of Embodiment 1 will be described.

In the stationary wireless apparatus 200, the signal generator 230 generates and outputs a transmission signal having a specified frequency, amplitude or phase. Further, it outputs information modulated by the specified frequency, amplitude or phase, as the transmission signal.

The transmitter 220 power-amplifies the transmission signal using an amplifier, and outputs it to the antenna 210. The antenna 210 radiates the thus-inputted transmission signal as an electric wave.

When the train is on rail in a location where the stationary wireless apparatus 200 is placed, the electric wave radiated from the stationary wireless apparatus 200 is received by the first antenna 110*a* of the mobile wireless apparatus 100 mounted on the train, and is then outputted to the receiver 120 as a first reception electric wave. Further, it is received by the second antenna 110*b* of the mobile wireless apparatus 100, and is then outputted to the receiver 120 as a second reception electric wave. Here, it is assumed that the first antenna 110*a* and the second antenna 110*b* are configured to be placed with the specified interval therebetween and nearly in parallel to the traveling direction of the train. Examples of the specified interval include 2 meters, for example. Namely, these antennas 110*a*, 110*b* are placed apart with an interval of a specified range or more so that the calculated Doppler frequencies are not both zero when the mobile wireless apparatus 100 is present in an area near to just beside the stationary wireless apparatus 200.

In the receiver 120, the electric wave coming from the stationary wireless apparatus 200 is taken out from the first reception electric wave, and is outputted to the Doppler frequency calculator 131 in the position detector 130 as a first reception signal. Likewise, the electric wave coming from the stationary wireless apparatus 200 is taken out from the second reception electric wave, and is outputted to the Doppler frequency calculator 131 as a second reception signal. The Doppler frequency calculator 131 calculates based on the inputted reception signal, a Doppler frequency arising due to movement of the train, and outputs the calculated Doppler frequency to the mobile-wireless-apparatus-position calculator 132. A first Doppler frequency is calculated from the first reception signal, and a second Doppler frequency is calculated from the second reception signal. Specifically, using FIG. 2, description will be made about a case where a continuous wave with a frequency of f is transmitted from the stationary wireless apparatus 200.

When a frequency of the transmitted electric wave is defined as "f"; a velocity of the electric wave as "c"; a traveling speed of the train as "v"; an angle established between a traveling direction of the train and a reaching direction in which the electric wave reaches the first antenna 110*a* as "$\theta_1$"; an angle established likewise by a reaching direction in which the electric wave reaches the second antenna 110*b* as "$\theta_2$", the Doppler frequencies derived therefrom are represented by the following formulae, respectively.

$$f_{d1} = V \times \cos \theta_1 \times f \div c$$

$$f_{d2} = V \times \cos \theta_2 \times f \div c$$

The reception signals are subjected to IQ detection with the frequency f to obtain IQ signals, which are then subjected to complex FFT computation, so that $f_{d1}$ and $f_{d2}$ are calculated.

At the time the mobile wireless apparatus 100 is approaching to the stationary wireless apparatus 200, the Doppler frequency becomes positive. Conversely, at the time the mobile wireless apparatus 100 is getting away from the stationary wireless apparatus 200, the Doppler frequency becomes negative.

Figure 2:
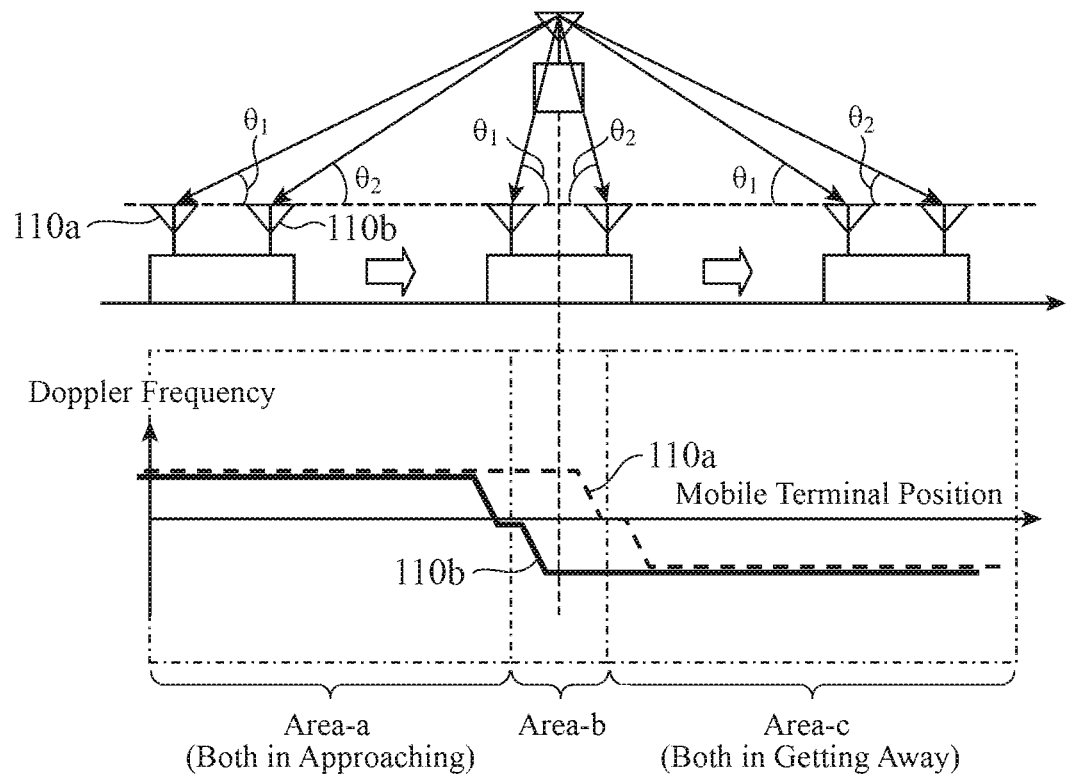
FIG. 2 is an illustration diagram of a Doppler frequency of the train position detection device according to Embodiment 1 of the invention.

According to the Doppler frequencies $f_{d1}$ and $f_{d2}$, there are three positional relationships between the mobile wireless apparatus 100 and the stationary wireless apparatus 200 as shown in FIG. 2. When $f_{d1}$ and $f_{d2}$ are both positive as in an area-a in FIG. 2, the first antenna 110*a* and the second antenna 110*b* are both approaching to the stationary wireless apparatus 200, and when they are both negative as in an area-c in FIG. 2, they are both getting away therefrom. When one of $f_{d1}$ and $f_{d2}$ is positive and the other is negative, the antenna 210 of the stationary wireless apparatus 200 is present between the first antenna 110a and the second antenna 110b (area-b in FIG. 2).

When the ratio between the Doppler frequencies becomes negative in the area-b in FIG. 2, in the mobile-wireless-apparatus-position calculator 132, the relative position of the mobile wireless apparatus 100 to the stationary wireless apparatus 200 is calculated based on the inputted Doppler frequencies, and the ratio between the Doppler frequencies and the relative position of the mobile wireless apparatus are outputted to the train position detector 140.

Figure 3:
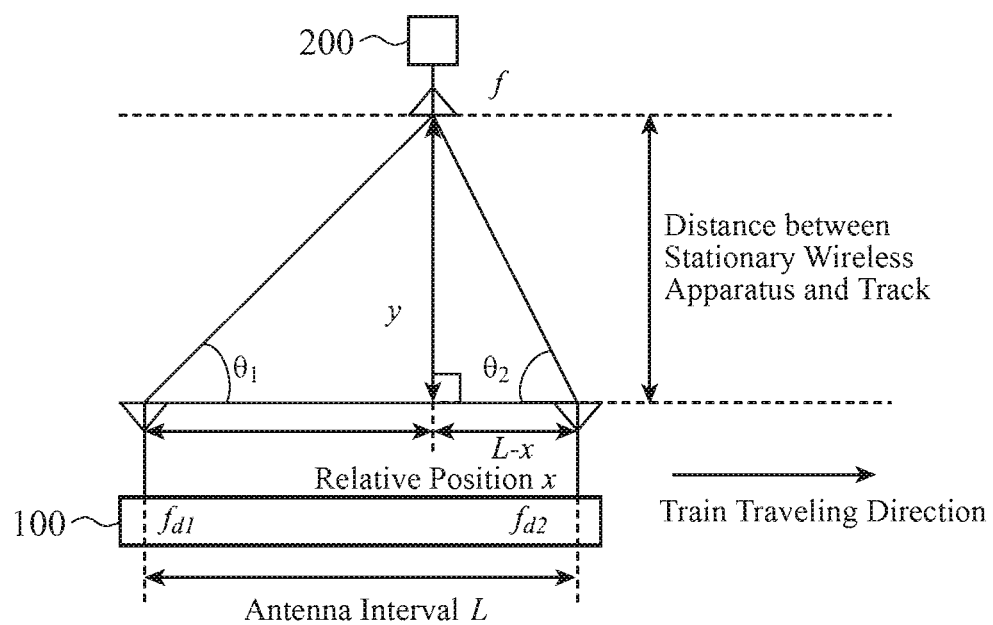
FIG. 3 is an illustration diagram showing calculation of a position of a mobile wireless apparatus by the train position detection device according to Embodiment 1 of the invention.
Figure 4:
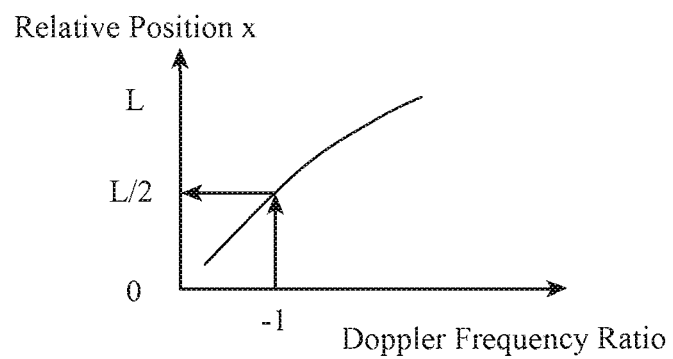
FIG. 4 is an illustration diagram showing a relationship between a ratio between Doppler-frequencies and a position x by the train position detection device according to Embodiment 1 of the invention.

As shown in FIG. 3, it is assumed that the locus along which the mobile wireless apparatus 100 passes just beside the stationary wireless apparatus 200 is linear, and that an arrow direction on the track is a traveling direction of the train. The distance between the stationary wireless apparatus 200 and the track is defined as "y", and an intersection between a perpendicular line drawn down from the stationary wireless apparatus 200 to the track and a straight line connecting the first antenna 110a and the second antenna 110b, is defined as the "relative position x" of the mobile wireless apparatus 100. The interval between the first antenna 110a and the second antenna 110b is defined as "L". In the figure, as the relationship among the distance "y", "x", "L" and the Doppler frequencies, there is given a relationship by the following formula, and the relationship gives a one-to-one correspondence as shown in FIG. 4. Thus, with reference to its table prepared beforehand, the relative position x of the mobile wireless apparatus 100 to the stationary wireless apparatus 200 is calculated.

$$\frac{fd1}{fd2} = \frac{\frac{v\cos\theta_1}{c}f}{\frac{v\cos\theta_2}{c}f} = \frac{\cos\theta_1}{\cos\theta_2} = \frac{\frac{x}{\sqrt{x^2+y^2}}}{\frac{L-x}{\sqrt{(L-x)^2+y^2}}}$$

When the ratio between the Doppler frequencies becomes −1, the relative position x becomes L/2.

When the ratio between the Doppler frequencies becomes negative, the passage judgement processor 141 judges that it is present within the area-b in FIG. 2, and outputs its judgment signal to the train position calculator 142. When the judgment signal is inputted, the train position calculator 142 calculates a train position on the basis of the placement position of the stationary wireless apparatus 200, a placement position in the train of the mobile wireless apparatus 100 and the relative position x of the mobile wireless apparatus to the stationary wireless apparatus, and outputs the calculated train position. Specifically, the train position is calculated in such a manner that kilometer information at which the stationary wireless apparatus 200 is placed is corrected by the mounted position in the train of the mobile wireless apparatus 100. How to acquire the position of the stationary wireless apparatus 200, the distance y, the placement position of the mobile wireless apparatus 100, which are used for that calculation, will be described below.

The position of the stationary wireless apparatus 200 and the distance y may be each retained beforehand as a known constant, or may be wirelessly transmitted while being added to the electric wave for the transmission signal, after retained in the stationary wireless apparatus 200. The mobile wireless apparatus 100 will use the thus-received position of the stationary wireless apparatus 200 and distance y for the calculation of the position of the mobile wireless apparatus and the train position. Instead, it is allowable that these pieces of information are retained on an unshown database and the database is referred to with a unique wireless-apparatus ID added to and specific to the stationary wireless apparatus 200.

Figure 5:
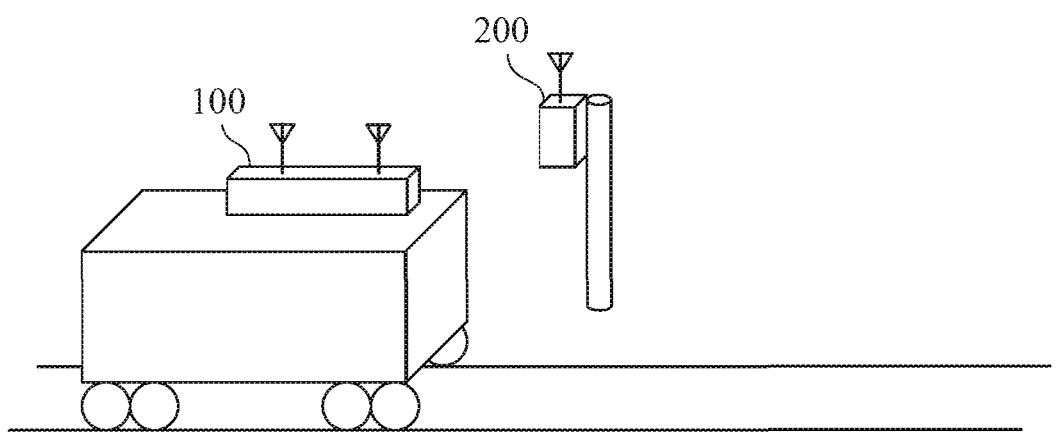
FIG. 5 is an illustration diagram showing an application example of the train position detection device according to Embodiment 1 of the invention.

FIG. 5 shows an application example of the train position detection device. This is a placement example for accurately detecting the position of the train in travelling. Here is shown a state where the stationary wireless apparatus 200 is mounted on an electric power pole beside the track and the mobile wireless apparatus 100 is mounted on the train. The train is measuring its own travel distance by use of, for example, a tacho-generator, to thereby constantly detect its own position by calculating the travel distance from a reference position. The tacho-generator counts the revolution number of the wheel and multiplies it by the circumferential length of the wheel, to thereby calculate the travel distance.

Because of idling slide of the wheel, a cumulative error occurs in the travel distance. The present device is used for correcting such a measurement error.

As described above, according to the train position detection device of Embodiment 1, it comprises:
a receiver to take out electric waves as reception signals respectively through a plurality of antennas, said plurality of antennas placed on a train traveling on a track with a specified interval therebetween, and said electric waves provided from a stationary wireless apparatus that is placed beside the track of the train and radiates, as an electric wave, a transmission signal having a specified frequency, amplitude or phase; a position detector to calculate a relative position of the plurality of antennas to the stationary wireless apparatus from a ratio between Doppler frequencies calculated respectively from the plural reception signals; and a train position detector to calculate a position of the train from the relative position, a placement position of the stationary wireless apparatus and placement positions in the train of the plurality of antennas. Thus, it is possible to highly accurately detect the train position.

When the train is traveling at a high speed, a time period in which a mobile wireless apparatus is positioned just beside the stationary wireless apparatus is very short, so that it becomes difficult to accurately detect a moment when the mobile wireless apparatus passes through just beside the stationary wireless apparatus. In particular, when the transmission signal is radiated intermittently, it is difficult to accurately detect the moment of passing through the just beside. According to the train position detection device of this embodiment, the relative positions of the plurality of antennas to the stationary wireless apparatus are calculated, and the position of the train is calculated from the thus-calculated relative positions, the placement position of the stationary wireless apparatus, and the placement positions in the train of the plurality of antennas, so that the train position can be detected highly accurately.

Further, according to the train position detection device of Embodiment 1, when it detects that the mobile wireless apparatus provided with the plurality of antennas is present in an area near to just beside the stationary wireless apparatus, the relative positions of the plurality of antennas to the stationary wireless apparatus are calculated. When the plurality of antennas are present in an area near to just beside the stationary wireless apparatus, the variation in the ratio between the Doppler frequencies becomes relatively larger than the variations in the relative positions of the plurality of antennas to the stationary wireless apparatus, so that the relative positions of the plurality of antennas to the stationary wireless apparatus can be calculated accurately.

Embodiment 2

Embodiment 2 is that which calculates a traveling speed of the train using a timewise variation of the relative position x of the mobile wireless apparatus 100 to the stationary wireless apparatus 200 having been described in Embodiment 1.

Figure 6:
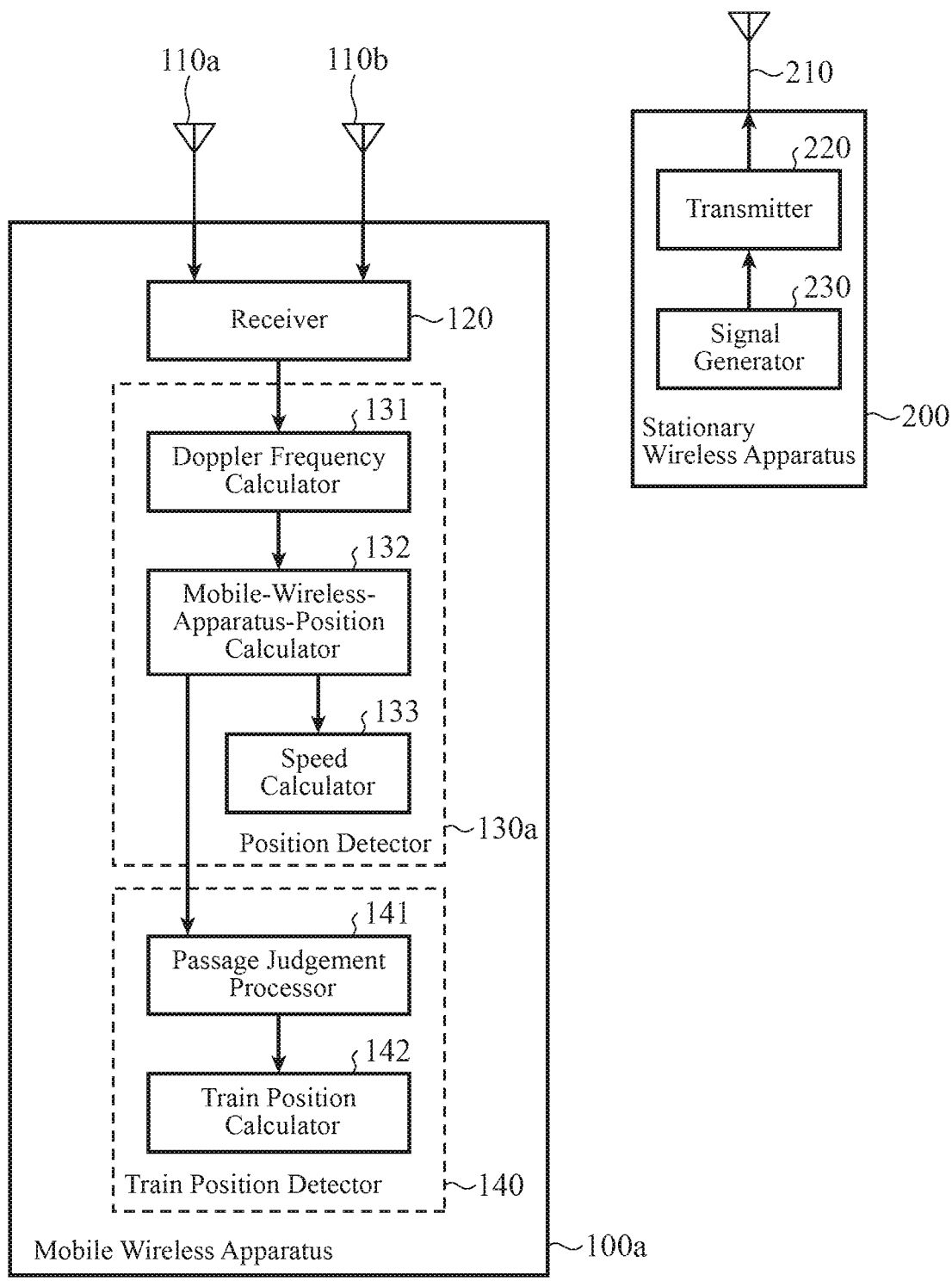
FIG. 6 is a configuration diagram showing a train position detection device according to Embodiment 2 of the invention.

FIG. 6 is a configuration diagram of a train position detection device according to Embodiment 2. In Embodiment 2, a position detector 130a in a mobile wireless apparatus 100a includes a speed calculator 133, so that it is configured to calculate the traveling speed of the train from a timewise variation of the calculated relative position. The configuration other than the above is similar to in Embodiment 1 shown in FIG. 1, so that the same reference numerals are given to the corresponding parts and their description is omitted here.

The position x of the mobile wireless apparatus 100a calculated by the mobile-wireless-apparatus-position calculator 132 is outputted to the speed calculator 133 and the passage judgement processor 141.

Using the following formula, the speed calculator 133 calculates a traveling speed v of the train from a variation $\Delta x$ of the position x per a time $\Delta t$, and outputs it.

$$v = \Delta x / \Delta t$$

As described above, according to the train position detection device of Embodiment 2, the position detector is configured to calculate the traveling speed of the train from a timewise variation of the relative position. Thus, it is possible to highly accurately calculate the traveling speed of the train, and to make a health diagnosis, etc. of the speed sensor mounted on the train using the value of the thus-calculated speed.

Embodiment 3

Embodiment 3 is an example in which the mobile-wireless-apparatus-position calculator 132 and the passage judgment processor 141 in Embodiment 1 are implemented with a more simplified device configuration. In Embodiment 1, it is detected that the mobile wireless apparatus 100 is present in an area near to just beside the stationary wireless apparatus 200, and the train position detection is executed according to any given position x within the antenna interval L in the mobile wireless apparatus 100; however, in Embodiment 3, a passage judgment is executed by detecting that the ratio between the Doppler frequencies becomes −1.

Figure 7:
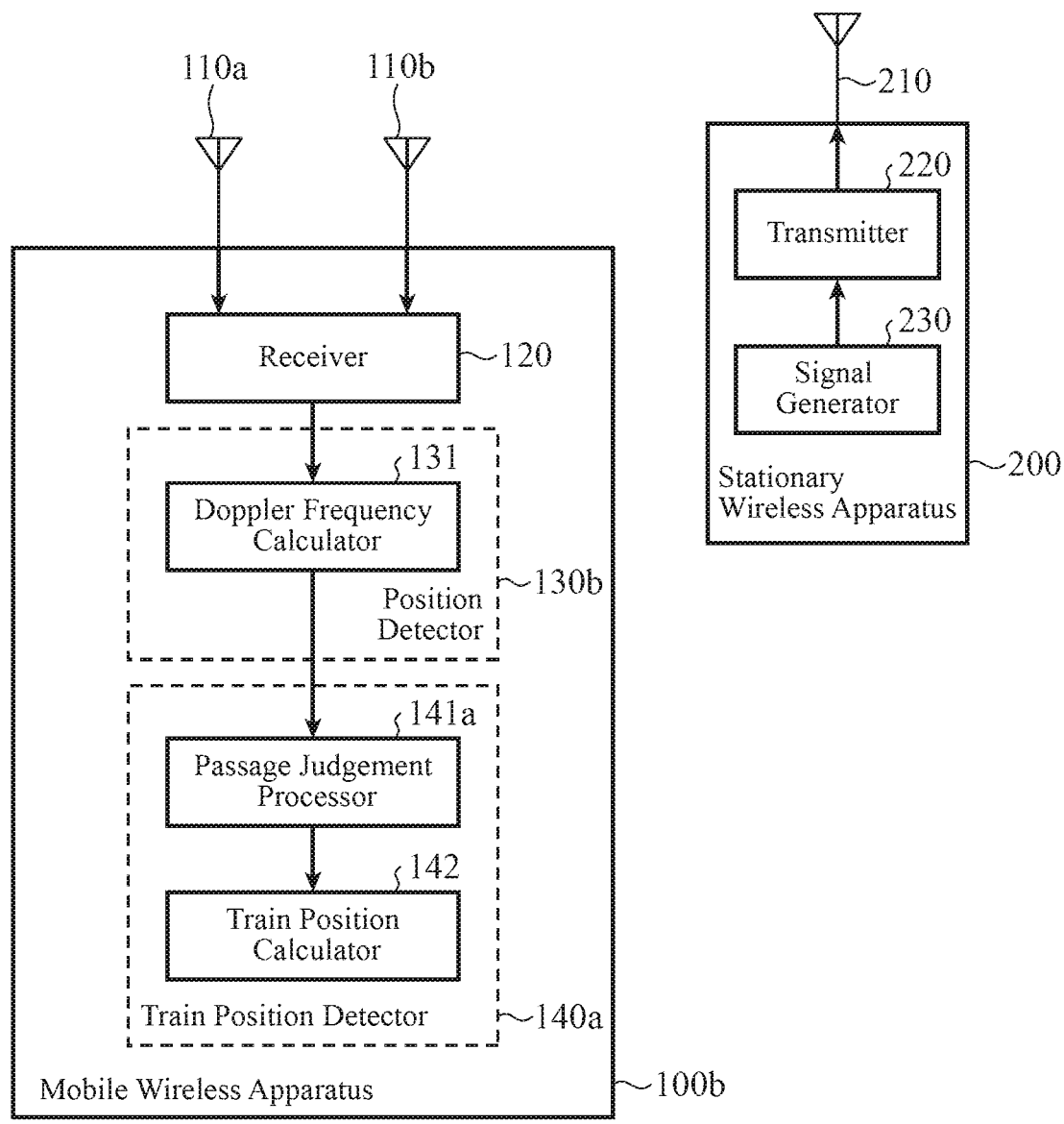
FIG. 7 is a configuration diagram showing a train position detection device according to Embodiment 3 of the invention.

FIG. 7 is a configuration diagram of a train position detection device according to Embodiment 3. In the figure, a mobile wireless apparatus 100b includes a receiver 120, a position detector 130b and a train position detector 140a. The position detector 130b includes a Doppler frequency calculator 131, and the train position detector 140a includes a passage judgment processor 141a and a train position calculator 142. The Doppler frequency calculator 131 has a configuration similar to the Doppler frequency calculator 131 in Embodiment 1 and outputs a plurality of Doppler frequencies. The passage judgment processor 141a, when the ratio between the Doppler frequencies becomes −1, judges that the mobile wireless apparatus 100b has passed through just beside the stationary wireless apparatus 200. The train position calculator 142 is configured, similarly to the train position calculator 142 in Embodiment 1, to calculate the position of the train from the placement position of the stationary wireless apparatus 200 and the placement position in the train of the mobile wireless apparatus 100b.

The configuration other than the above is similar to in Embodiment 1 shown in FIG. 1, so that the same reference numerals are given to the corresponding parts and their description is omitted here.

Next, operations of the train position detection device of Embodiment 3 will be described.

The Doppler frequency calculated by the Doppler frequency calculator 131 in the position detector 130b is outputted to the passage judgment processor 141a in the train position detector 140a. Upon detection of the ratio between the Doppler frequencies becoming −1, the passage judgment processor 141a judge that it has passed through the just beside, and outputs the judgement signal to the train position calculator 142. Specifically, when the ratio between the Doppler frequencies becomes −1, x=L/2 is constantly established. When the judgement signal is inputted, the train position calculator 142 calculates the train position on the basis of the placement position of the stationary wireless apparatus 200 and the placement position in the train of the mobile wireless apparatus 100b, and outputs the thus-calculated train position.

As described above, according to the train position detection device of Embodiment 3, it comprises:
a receiver to take out electric waves as reception signals respectively through a plurality of antennas, said plurality of antennas placed on a train traveling on a track with a specified interval therebetween, and said electric waves provided from a stationary wireless apparatus that is placed beside the track of the train and radiates, as an electric wave, a transmission signal having a specified frequency, amplitude or phase; a position detector to calculate Doppler frequencies calculated from the plural reception signals; and a train position detector to judge, when a ratio between the Doppler frequencies becomes −1, that the plurality of antennas has passed through just beside the stationary wireless apparatus, to thereby calculate a position of the train from a placement position of the stationary wireless apparatus and placement positions in the train of the plurality of antennas. Thus, it becomes unnecessary to minutely calculate the relative position x of the mobile wireless apparatus to the stationary wireless apparatus, so that train-position detection can be achieved with a more simplified device configuration.

Embodiment 4

Figure 8:
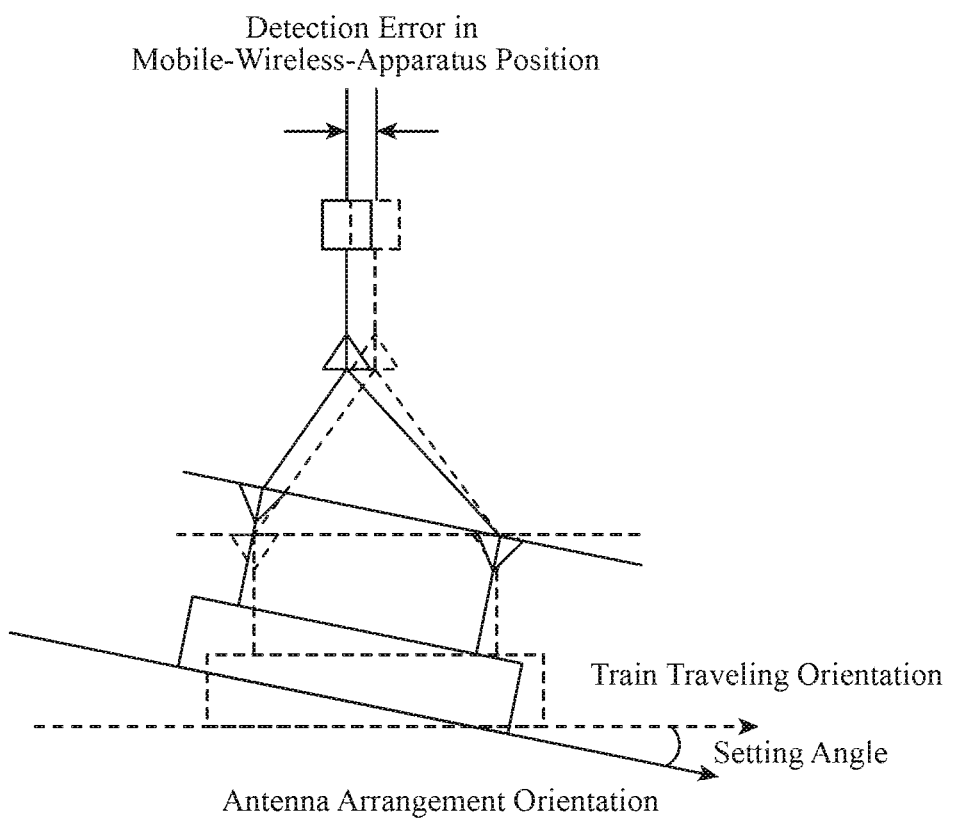
FIG. 8 is an illustration diagram of a measurement error due to a setting angle of a mobile wireless apparatus in a train position detection device according to Embodiment 4 of the invention.

In Embodiment 1 to Embodiment 3, description has been made about a case where a traveling orientation of the train and an arrangement orientation of the antennas of the mobile wireless apparatus could be set almost parallel to each other. However, the train-traveling orientation and the antenna-arrangement orientation are not always set almost parallel. An angle established between the train-traveling orientation and the antenna-arrangement orientation is defined as a setting angle (yaw angle). In FIG. 8, there is shown a position detection of the mobile wireless apparatus when the setting angle is not zero. In the figure, portions depicted by broken lines represent a relationship between the stationary wireless apparatus and the mobile wireless apparatus when the ratio between the Doppler frequencies of the signals received by two antennas becomes −1 in the case where the antenna arrangement orientation in the mobile wireless apparatus and the train traveling orientation are matched to each other; whereas portions depicted by sold lines represent a relationship between the stationary wireless apparatus and the mobile wireless apparatus when the ratio between the Doppler frequencies of the signals received by the two antennas becomes −1 in the case where the setting angle is not zero. The position of the mobile wireless apparatus relative to the stationary wireless apparatus, at which the ratio between the Doppler frequencies becomes −1, differs depending on the setting angle, so that there is a problem that a detection error occurs in the mobile-wireless-apparatus position. Embodiment 4 is an embodiment to solve this problem.

Figure 9:
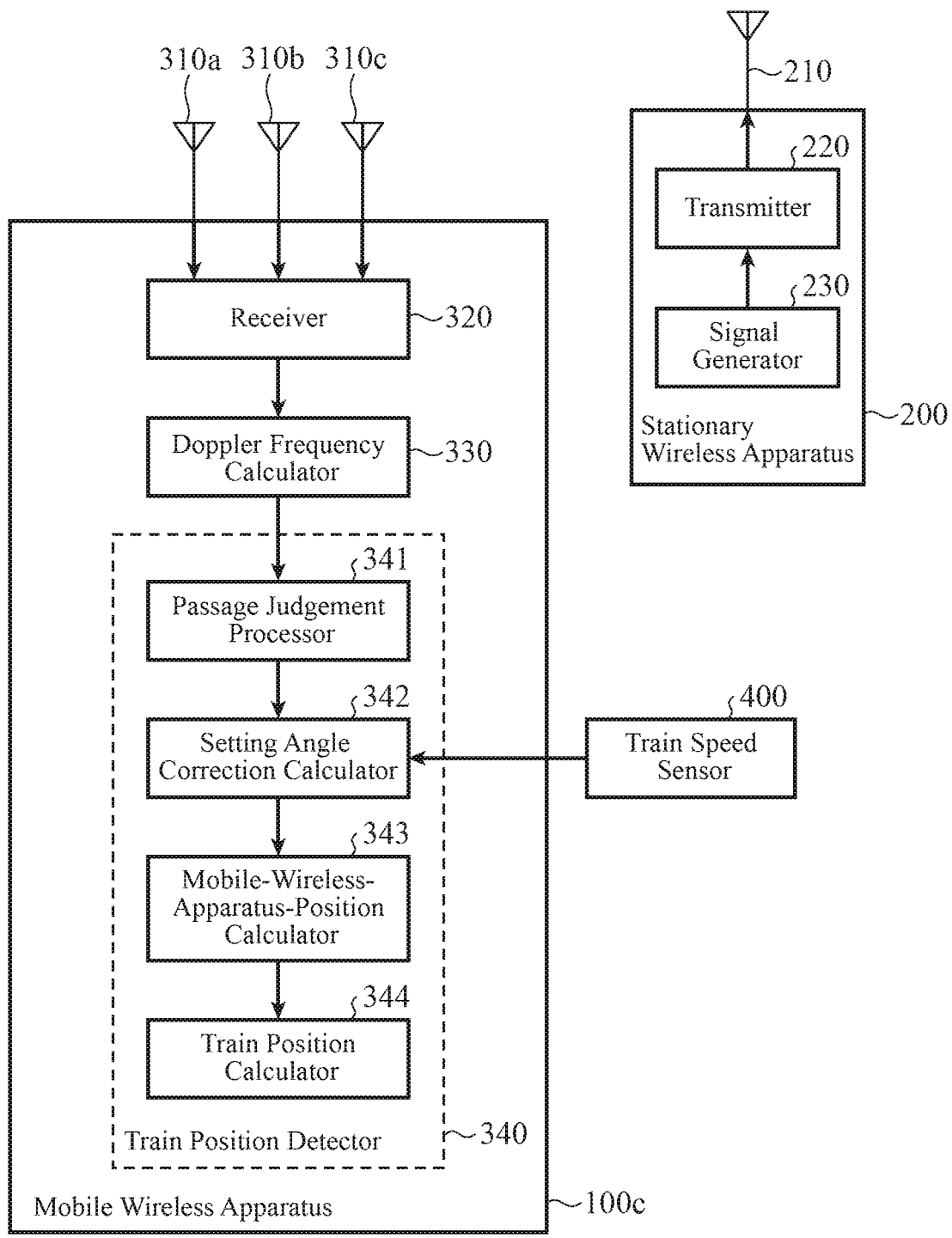
FIG. 9 is a configuration diagram showing the train position detection device according to Embodiment 4 of the invention.

FIG. 9 is a configuration diagram of a train position detection device according to Embodiment 4. As shown in the figure, the train position detection device of Embodiment 4 is provided to be applied to a configuration comprising a mobile wireless apparatus 100c mounted on a train and a stationary wireless apparatus 200 placed beside a track. Here, the configuration of the stationary wireless apparatus 200 is similar to in Embodiments 1 to 3, so that its description is omitted here.

The mobile wireless apparatus 100c includes: three antennas (a first antenna 310a, a second antenna 310b, a third antenna 310c) that are placed with specified intervals therebetween; a receiver 320; a Doppler frequency calculator 330; a train position detector 340; and a train speed sensor 400. The receiver 320 is a processing unit that outputs, as reception signals, the respective electric waves received at the first antenna 310a to the third antenna 310c from the stationary wireless apparatus 200. The Doppler frequency calculator 330 is a calculation unit that calculates three Doppler frequencies from the respective reception signals taken out by the receiver 320. The train position detector 340 is that which calculates the train position on the basis of the three or more Doppler frequencies calculated by the Doppler frequency calculator 330, and includes a passage judgement processor 341, a setting angle correction calculator 342, a mobile-wireless-apparatus-position calculator 343 and a train position calculator 344.

The passage judgement processor 341 is a processing unit that uses the three Doppler frequencies calculated by the Doppler frequency calculator 330, to thereby judge, upon detection of a ratio between those among the plural Doppler frequencies becoming −1, that any two of antennas among the three antennas is passing through just beside the stationary wireless apparatus 200, and then derives a plurality of passage judgement signals. The setting angle correction calculator 342 is a processing unit that calculates a setting angle of a straight line connecting the three antennas with respect to the train traveling direction, from the plurality of passage judgement signals outputted from the passage judgment processor 341 and the traveling speed of the train acquired by the train speed sensor 400. The mobile-wireless-apparatus-position calculator 343 is a processing unit that calculates the relative position of the mobile wireless apparatus 100c to the stationary wireless apparatus 200 on the basis of the setting angle calculated by the setting-angle correction calculator 342, the distance between the stationary wireless apparatus 200 and the track, and the antenna interval. The train position calculator 344 is a processing unit that calculates the position of the train from the placement position of the stationary wireless apparatus, the placement position in the train of the mobile wireless apparatus 100c and the relative position calculated by the mobile-wireless-apparatus-position calculator 343.

Next, operations of the train position detection device of Embodiment 4 will be described.

In the stationary wireless apparatus 200, the signal generator 230 generates and outputs a transmission signal having a specified frequency, amplitude or phase. Further, it outputs information modulated by the specified frequency, amplitude or phase, as the transmission signal.

The transmitter 220 power-amplifies the transmission signal using an amplifier, and outputs it to the antenna 210. The antenna 210 radiates the thus-inputted transmission signal as an electric wave.

When the train is on rail in a location where the stationary wireless apparatus 200 is placed, the electric wave radiated from the stationary wireless apparatus 200 is received by the first antenna 310a of the mobile wireless apparatus 100c mounted on the train, and is then outputted to the receiver 120 as a first reception electric wave. Also, it is received by the second antenna 310b of the mobile wireless apparatus 100c, and is then outputted to the receiver 320 as a second reception electric wave. Further, it is received by the third antenna 310c of the mobile wireless apparatus 100c, and is then outputted to the receiver 320 as a third reception electric wave.

Figure 10:
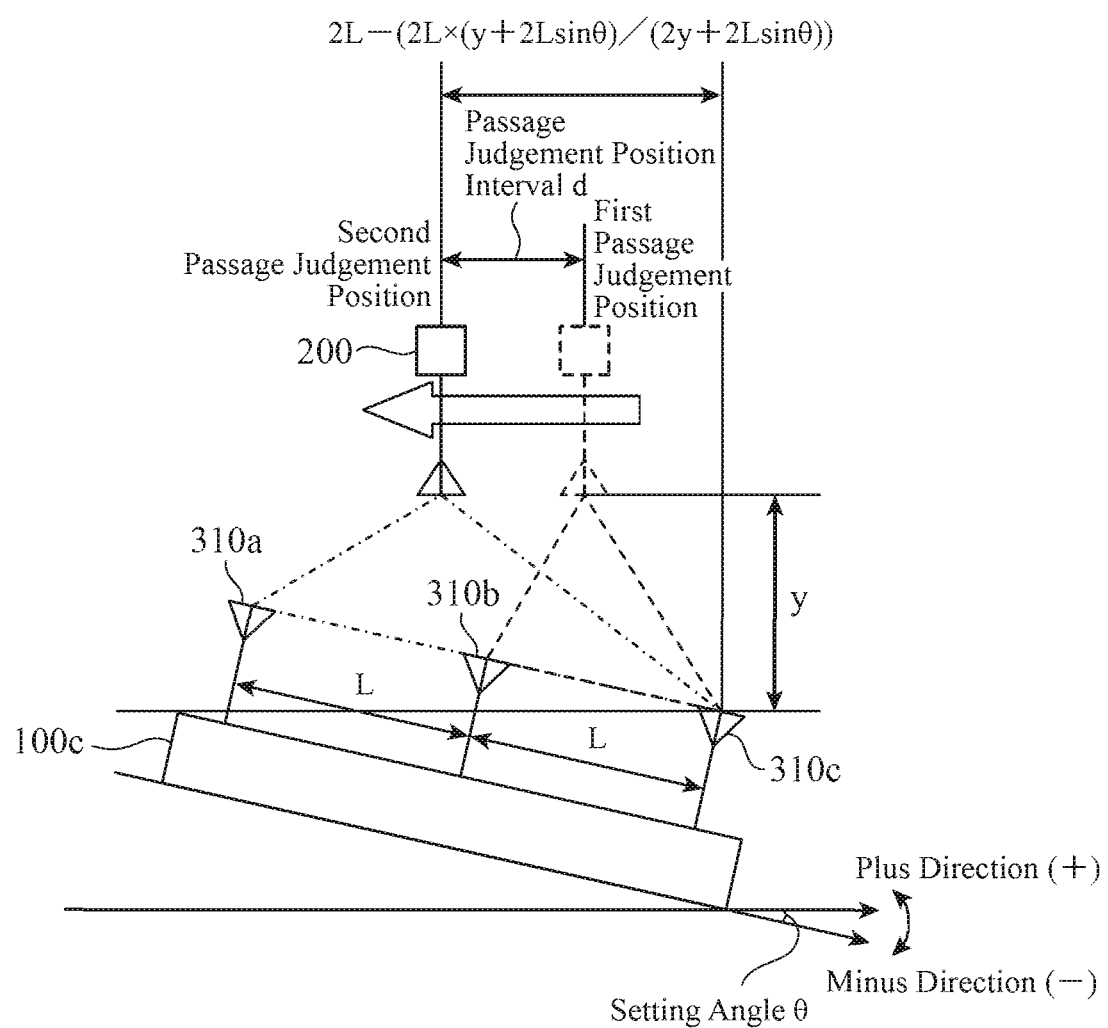
FIG. 10 is an illustration diagram showing operations of the train position detection device according to Embodiment 4 of the invention.

FIG. 10 is an illustration diagram showing a state where the mobile wireless apparatus 100c mounted at a setting angle θ is going to pass through beside the stationary wireless apparatus 200.

Here, the first antenna 310a, the second antenna 310b and the third antenna 310c are configured to be placed in a linearly aligned manner with respective intervals L therebetween. Further, it is assumed that, when the mobile wireless apparatus 100c approaches to, passes through and gets away from the stationary wireless apparatus 200, the third antenna 310c, the second antenna 310b and the first antenna 310a pass in this order through just beside the stationary wireless apparatus 200. In the figure, the diagram is drawn as viewed from the mobile wireless apparatus 100c, so that the stationary wireless apparatus 200 is relatively assumed approaching to the mobile wireless apparatus 100c.

In the receiver 320, the electric wave outputted from the stationary wireless apparatus 200 is taken out from the first reception electric wave, and is outputted to the Doppler frequency calculator 330 as a first reception signal. Likewise, the electric wave outputted from the stationary wireless apparatus 200 is taken out from the second reception electric wave, and is outputted to the Doppler frequency calculator 330 as a second reception signal. Likewise, the electric wave outputted from the stationary wireless apparatus 200 is taken out from the third reception electric wave, and is outputted to the Doppler frequency calculator 330 as a third reception signal.

The Doppler frequency calculator 330 calculates based on the inputted reception signal, a Doppler frequency arising due to movement of the train, and outputs the calculated Doppler frequency to the train position detector 340. Namely, the Doppler frequency calculator 330 calculates the first Doppler frequency from the first reception signal, calculates the second Doppler frequency from the second reception signal and calculates the third Doppler frequency from the third reception signal. The thus-calculated Doppler frequencies are outputted to the passage judgment processor 341.

The passage judgment processor 341 detects that the ratio between the second Doppler frequency and the third Doppler frequency becomes −1, to thereby output a first passage judgement signal to the setting-angle correction calculator 342. Further, it detects that the ratio between the first Doppler frequency and the third Doppler frequency becomes −1, to thereby output a second passage judgement signal to the setting-angle correction calculator 342.

The train speed sensor 400 measures the traveling speed of the train and outputs a speed value V to the setting-angle correction calculator 342. The setting-angle correction calculator 342 measures a time t from when the first passage judgement signal is inputted until the second passage judgement signal is inputted. The measured time t is multiplied by the speed value V to thereby calculate a passage judgement position interval d. The setting angle θ is obtained from the calculated passage judgement position interval d.

The setting angle θ is outputted to the mobile-wireless-apparatus-position calculator 343.

Figure 11:
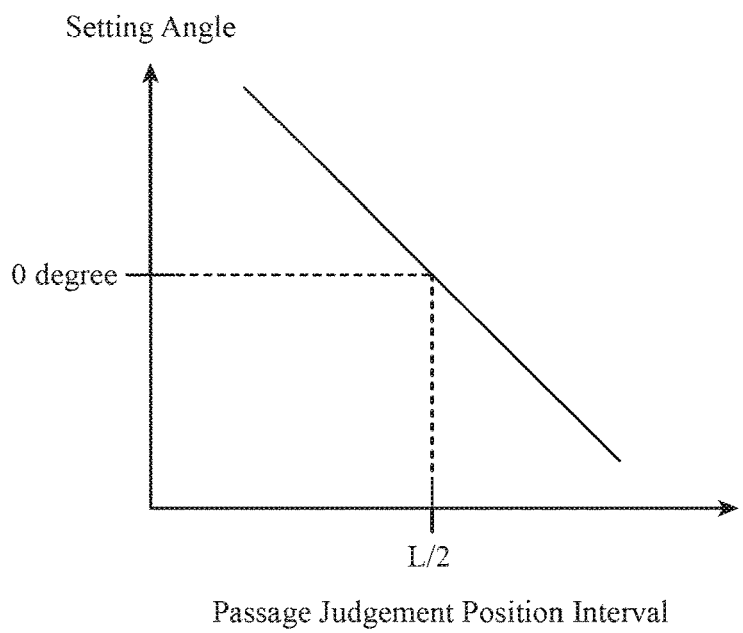
FIG. 11 is an illustration diagram showing a relationship between a passage judgment position interval and a setting angle by the train position detection device according to Embodiment 4 of the invention.

FIG. 11 is an illustration diagram showing a relationship between the passage-judgment-position interval d and the setting angle θ. There is a one-to-one relationship between the passage-judgment-position interval d and the setting angle θ. When the correspondence table for them is prepared beforehand using the distance y and the interval L between the two antennas, the setting angle θ is obtained with reference to that table according to the passage-judgment-position interval d.

When the setting angle θ is inputted, the mobile-wireless-apparatus-position calculator 343 calculates the mobile-wireless-apparatus position x, which is a position at the time the second passage judgement signal is detected, and is a relative position of the mobile wireless apparatus 100c to the stationary wireless apparatus 200. The mobile-wireless-apparatus position x is calculated using the antenna interval L, the distance y and the setting angle θ by the following formula.

$$x=2L-(2L\times(y+2L\sin\theta)/(2y+2L\sin\theta))$$

The train position calculator 344 calculates the train position on the basis of the mobile-wireless-apparatus position, the placement position of the stationary wireless apparatus 200 and the placement position in the train of the mobile wireless apparatus 100c, and outputs the thus-calculated train position.

Note that, in Embodiment 4, although the number of the antennas is given as three, the number is not limited thereto and may be four or more. Further, in the above case, the ratio between the first Doppler frequency and the third Doppler frequency, and the ratio between the second Doppler frequency and the third Doppler frequency are used; however, these ratios may be from any other combinations so far as two or more Doppler frequency ratios can be calculated therefrom.

As described above, according to the train position detection device of Embodiment 4, it comprises: a receiver to take out electric waves as reception signals respectively through three or more antennas, these antennas placed on a train traveling on a track with specified intervals therebetween, and said electric waves provided from a stationary wireless apparatus that is placed beside the track of the train and radiates, as an electric wave, a transmission signal having a specified frequency, amplitude or phase; a Doppler frequency calculator to calculate three or more Doppler frequencies respectively from the reception signals taken out by the receiver; a passage judgement processor to judge, when detects that a ratio between those among the plural Doppler frequencies becomes −1, that any two of antennas among the three or more antennas is passing through just beside the stationary wireless apparatus, to thereby calculate a plurality of passage judgement signals; a setting-angle correction calculator to calculate a setting angle of a line that connects said three or more antennas relative to a traveling direction of the train, from the plurality of passage judgement signals and a traveling speed of the train; a position calculator to calculate a relative position of said three or more antennas to the stationary wireless apparatus on the basis of the setting angle, a distance between the stationary wireless apparatus and the track, and the intervals between the antennas; and a train position calculator to calculate a position of the train from a placement position of the stationary wireless apparatus, placement positions of said three or more antennas in the train, and the relative position. Thus, it is possible to suppress an error due to the setting angle of the antenna placement positions with respect to the train traveling direction, to thereby calculate the train speed more highly accurately.

Embodiment 5

Embodiment 5 is an example in which a reaching angle at which the electric wave reaches the mobile wireless apparatus 100 from the stationary wireless apparatus 200 is detected from the relative position of the mobile wireless apparatus 100 to the stationary wireless apparatus 200 measured in Embodiment 1, and the traveling speed of the train is detected based on the thus-detected electric-wave reaching angle.

Figure 12:
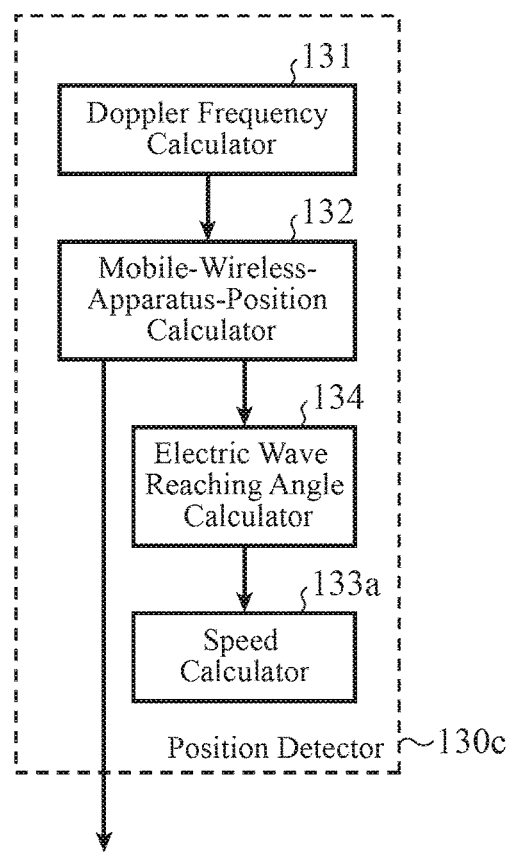
FIG. 12 is a configuration diagram showing a position detector in a train position detection device according to Embodiment 5 of the invention.

FIG. 12 is a configuration diagram showing a position detector 130c in a train position detector according to Embodiment 5. The position detector 130c of Embodiment 5 includes a Doppler frequency calculator 131, a mobile-wireless-apparatus-position calculator 132, an electric-wave reaching angle calculator 134 and a speed calculator 133a. In the train position detection device, the configuration other than the above is similar to in Embodiment 1 shown in FIG. 1, so that its description is omitted here.

Next, operations of the train position detection device of Embodiment 5 will be described.

When the relative position x of the mobile wireless apparatus 100 to the stationary wireless apparatus 200 having been measured by the mobile-wireless-apparatus-position calculator 132 is inputted, the electric-wave reaching angle calculator 134 calculates respective reaching angle $\theta_1$ of electric wave and reaching angle $\theta_2$ of electric wave at which the electric wave radiated from the stationary wireless apparatus 200 reaches the antennas 110a and 110b of the mobile wireless apparatus 100, respectively, and outputs them as the electric-wave reaching angles to the speed calculator 133a.

The electric-wave reaching angles $\theta_1$, $\theta_2$ are calculated using the relative position x, the interval L between the antennas 110a and 110b, and the distance y between the stationary wireless apparatus 200 and the track, by the following formula.

$$\theta_1 = \tan^{-1}(y/x)$$

$$\theta_2 = \tan^{-1}(y/(L-x))$$

When the electric-wave reaching angles are inputted, the speed calculator 133a calculates the traveling speed v of the train from the electric-wave reaching angle $\theta_1$ or $\theta_2$, the Doppler frequency $f_{d1}$ or $f_{d2}$, the frequency f of the electric wave and the velocity c of the electric wave, using the following formula, and outputs it as the train speed.

$$v = f_{d1}/\cos\theta_1/f \times C$$

or $$v = f_{d2}/\cos\theta_2/f \times c$$

In Embodiment 2, the speed of the train is calculated from the variation Δx of the relative position x per a time Δt, whereas in Embodiment 5, the speed of the train is calculated from the relative position x and the electric-wave reaching angle. Thus, it is possible to calculate the speed of the train without using plural measurement point for the relative position x.

As described above, according to the train position detection device of Embodiment 5, the position detector is configured to calculate the electric-wave reaching angles at which the electric wave radiated from the stationary wireless apparatus reaches the antennas, from the relative position, the distance between the stationary wireless apparatus and the track, and the antenna interval. Thus, it is possible to calculate the reaching direction of the electric wave radiated from the stationary wireless apparatus.

Further, according to the train position detection device of Embodiment 5, the position detector is configured to calculate the traveling speed of the train using the electric-wave reaching angle, the Doppler frequency and the specified frequency. Thus, it is possible to make a health diagnosis, etc. of the speed sensor mounted on the train using the thus-calculated speed of the train.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

As shown above, the train position detection device according to the invention is related to a configuration for detecting the position of the train at a fixed point, and is suited to be used in a train traffic control system, for detecting the position of the train.

DESCRIPTION OF REFERENCE NUMERALS AND SIGNS 100, 100a, 100b, 100c: mobile wireless apparatus, 110a, 310a: first antenna, 110b, 310b: second antenna, 310c: third antenna, 120, 320: receiver, 130, 130a, 130b, 130c: position detector, 131, 330: Doppler frequency calculator, 132: mobile-wireless-apparatus-position calculator, 133, 133a: speed calculator, 134: electric-wave reaching angle calculator, 140, 140a, 340: train position detector, 141, 141a, 341: passage judgement processor, 142, 344: train position calculator, 200: stationary wireless apparatus, 210: antenna, 220: transmitter, 230: signal generator, 342: setting-angle correction calculator, 343: mobile-wireless-apparatus-position calculator, 400: train speed sensor.

The invention claimed is:

1. A train position detection device mounted on a train, comprising:
a receiver to receive electric waves as reception signals respectively through a first antenna and a second antenna, the first and second antennas placed on the train traveling on a track with a specified fixed interval therebetween, and the electric waves provided from a stationary wireless apparatus that is placed beside the track of the train and radiates, as an electric wave, a transmission signal having a specified frequency, amplitude or phase; and
a position detector to calculate a relative position of the first and second antennas to the stationary wireless apparatus from a ratio between Doppler frequencies calculated respectively from the plural reception signals, the relative position being the distance between the first antenna and an intersection between a perpendicular line drawn from the stationary wireless apparatus to the track and a straight line connecting the first antenna and the second antenna, wherein when the ratio between the Doppler frequencies calculated from the plural reception signals becomes negative, the position detector detects that the stationary wireless apparatus is between the first and second antennas, to thereby calculate the relative position of the first and second antennas to the stationary wireless apparatus on the basis of a distance between the stationary wireless apparatus and the track, and the interval between the first and second antennas.

2. The train position detection device of claim 1, wherein the position detector calculates a traveling speed of the train from a timewise variation of the relative position.

3. The train position detection device of claim 1, wherein the position detector calculates an electric-wave reaching angle at which the electric wave radiated from the stationary wireless apparatus reaches the first antenna, from the relative position, a distance between the stationary wireless apparatus and the track, and the interval between the first and second antennas.

4. The train position detection device of claim 3, wherein the position detector calculates a traveling speed of the train, using the electric-wave reaching angle, the Doppler frequency and the specified frequency.

5. The train position detection device of claim 1, further comprising a train position detector to calculate a position of the train from the relative position, a placement position of the stationary wireless apparatus and placement positions in the train of the first and second antennas.

6. The train position detection device of claim 1, wherein electric waves from the same stationary wireless apparatus are received through the first and second antennas placed on the train, and the position detector calculates the relative position from a ratio between Doppler frequencies obtained from the electric waves transmitted from the same stationary wireless apparatus.

7. A train position detection device, comprising:
a receiver to receive electric waves as reception signals respectively through three or more antennas, these antennas placed on a train traveling on a track with specified intervals therebetween, and said electric waves provided from a stationary wireless apparatus that is placed beside the track of the train and radiates, as an electric wave, a transmission signal having a specified frequency, amplitude or phase;
a Doppler frequency calculator to calculate three or more Doppler frequencies respectively from the reception signals received by the receiver;
a passage judgement processor to judge, when it detects that a ratio between those among the plural Doppler frequencies becomes −1, that any two of antennas among the three or more antennas is passing through just beside the stationary wireless apparatus, to thereby calculate a plurality of passage judgement signals;
a setting-angle correction calculator to calculate a setting angle of a line that connects the three or more antennas relative to a traveling direction of the train, from the plurality of passage judgement signals and a traveling speed of the train; and
a position calculator to calculate a relative position of the three or more antennas to the stationary wireless apparatus on the basis of the setting angle, a distance between the stationary wireless apparatus and the track, and the intervals between the antennas.

8. The train position detection device of claim 7, further comprising a train position calculator to calculate a position of the train from a placement position of the stationary wireless apparatus, placement positions of the three or more antennas in the train, and the relative position.

* * * * *